(12) United States Patent
Nakamura et al.

(10) Patent No.: US 7,948,397 B2
(45) Date of Patent: May 24, 2011

(54) IMAGE RECOGNITION APPARATUSES, METHODS AND PROGRAMS

(75) Inventors: Masaki Nakamura, Okazaki (JP); Tomoaki Ishikawa, Okazaki (JP); Osamu Aisaka, Okazaki (JP); Kota Irie, Sagamihara (JP); Naoki Kourogi, Hitachinaka (JP); Takeshi Shima, Mito (JP); Masahiro Kiyohara, Hitachinaka (JP)

(73) Assignees: Aisin AW Co., Ltd., Anjo (JP); Hitachi, Ltd., Tokyo (JP)

( * ) Notice: Subject to any disclaimer, the term of this patent is extended or adjusted under 35 U.S.C. 154(b) by 270 days.

(21) Appl. No.: 12/292,887

(22) Filed: Nov. 28, 2008

(65) Prior Publication Data

US 2009/0174577 A1    Jul. 9, 2009

(30) Foreign Application Priority Data

Nov. 29, 2007   (JP) ................. 2007-308922

(51) Int. Cl.
*G08G 1/16* (2006.01)
(52) U.S. Cl. ........ 340/903; 340/933; 340/942; 340/435; 340/436

(58) Field of Classification Search .................. 340/933, 340/942, 435, 436
See application file for complete search history.

(56) References Cited

U.S. PATENT DOCUMENTS
2005/0256636 A1   11/2005   Miyashita et al.

FOREIGN PATENT DOCUMENTS
JP   A-2005-322166   11/2005
JP   A-2007-200191   8/2007

*Primary Examiner* — Daryl Pope
(74) *Attorney, Agent, or Firm* — Oliff & Berridge, PLC

(57) ABSTRACT

Image information apparatuses, methods, and programs acquire image information of a plurality of frames of images sensed at predetermined regular time intervals. The apparatuses, methods, and programs detect a leading and trailing end of a lane mark included in a detection area defined in each frame of the image information. The apparatuses, methods, and programs detect a detected distance from one of the leading and trailing end of the lane mark to the other one as a detected distance based on the speed of the vehicle and the number of frames between a frame in which one of the leading end and the trailing end of the lane mark is detected and a frame in which the other one of the leading end and the trailing end of the lane mark is detected and determine a lane mark type of the lane mark on the basis of the detected distance.

16 Claims, 9 Drawing Sheets

IMAGE RECOGNITION APPARATUSES, METHODS AND PROGRAMS

INCORPORATION BY REFERENCE

The disclosure of Japanese Patent Application No. 2007-308922, filed on Nov. 29, 2007, including the specification, drawings and abstract thereof, is incorporated herein by reference in its entirety.

BACKGROUND

1. Related Technical Fields

Related technical fields include image recognition apparatuses, methods and programs for acquiring image information including at least an image of a road surface in an area close to a vehicle, and determining the type of a lane mark included in the image information by performing an image recognition process on the acquired image information.

2. Related Art

In recent years, in fields of navigation apparatuses and vehicle control apparatuses, various techniques have been developed to recognize various types of lane marks such as solid-line or broken-line lane marks disposed on road surfaces, and the techniques are used to recognize and maintain a vehicle within a lane in which a vehicle is running, and so on.

As one of techniques associated with the lane mark recognition, for example, a running lane recognition apparatus is disclosed in Japanese Unexamined Patent Application Publication No. 2005-322166. In this running lane recognition apparatus, an image is taken and the image is converted into a plan-view image of a road viewed from above by performing a coordinate transformation process. Thereafter, using the plan-view image, lane mark lengths are determined for lane marks detected in two areas defined in the plan-view image, wherein the two areas are defined as adjacent locations in the same direction as the running direction of the vehicle. If the lengths detected for the lane marks are greater than a predetermined value in both areas, it is determined that the lane marks are solid lines. In a case where the lane mark lengths are greater than the predetermined value only in one of the two areas, it is determined that the lane mark is a broken line. In a case where the lengths are smaller than the predetermined value in both areas, it is determined that there is no lane mark. According to the determination result as to the type of the lane mark, the running lane recognition apparatus determines the lane in which the vehicle is running.

Another example of a running lane recognition apparatus is disclosed in Japanese Unexamined Patent Application Publication No. 2007-200191. In this running lane recognition apparatus, as in the apparatus disclosed in the Japanese Unexamined Patent Application Publication No. 2005-322166, a coordinate transformation process is first performed to convert an image into a plan-view image of a road viewed from above. Thereafter, a plurality of lane detection areas are set in one frame of plan-view image, and the integral intensity is calculated for each area. If the calculated integral intensity is substantially constant for the plurality of areas, it is determined that the lane mark of interest is a solid line. On the other hand, if the integral intensity calculated for a plurality of areas varies with time and from one area to another, it is determined that the lane mark of interest is a broken line. On the basis of the result of the determination as to the type of the lane mark, the running lane recognition apparatus determines a lane in which a vehicle of a user is running.

SUMMARY

In the conventional lane mark recognition techniques described above, it is necessary to perform the coordinate transformation process to convert a sensed image into a plan-view image of a road viewed from vertically above. It is also necessary to divide the sensed image into a plurality of areas, and perform the image processing process on each area. Thus, to recognize lane marks, it is necessary to perform a complicated process that causes a large processing load to be imposed on the apparatus. The large processing load creates a processing delay. To reduce the processing delay, it is necessary to increase the processing speed, which increases the cost.

Exemplary implementations of the broad inventive principles described herein provide an image recognition apparatus, an image recognition program and an image recognition method that accurately recognizes the type of a lane mark without needing complicated processing.

Exemplary implementations provide image recognition apparatuses, programs and methods that acquire image information of a plurality of frames of images sensed at predetermined regular time intervals, each image including at least a road surface of an area close to a vehicle. The apparatuses, programs and methods detect a leading end and a trailing end of a lane mark included in a detection area defined in each frame of the image information. The apparatuses, programs and methods detect a detected distance from one of the leading end and the trailing end of the lane mark to the other one as a detected distance on the basis of the speed of the vehicle and the number of frames between a frame in which one of the leading end and the trailing end of the lane mark is detected and a frame in which the other one of the leading end and the trailing end of the lane mark is detected. The apparatuses, programs and methods determine a lane mark type of the lane mark on the basis of the detected distance.

BRIEF DESCRIPTION OF THE DRAWINGS

Exemplary implementations will now be described with reference to the accompanying drawings, wherein.

DETAILED DESCRIPTION OF EXEMPLARY IMPLEMENTATIONS

Figure 1:
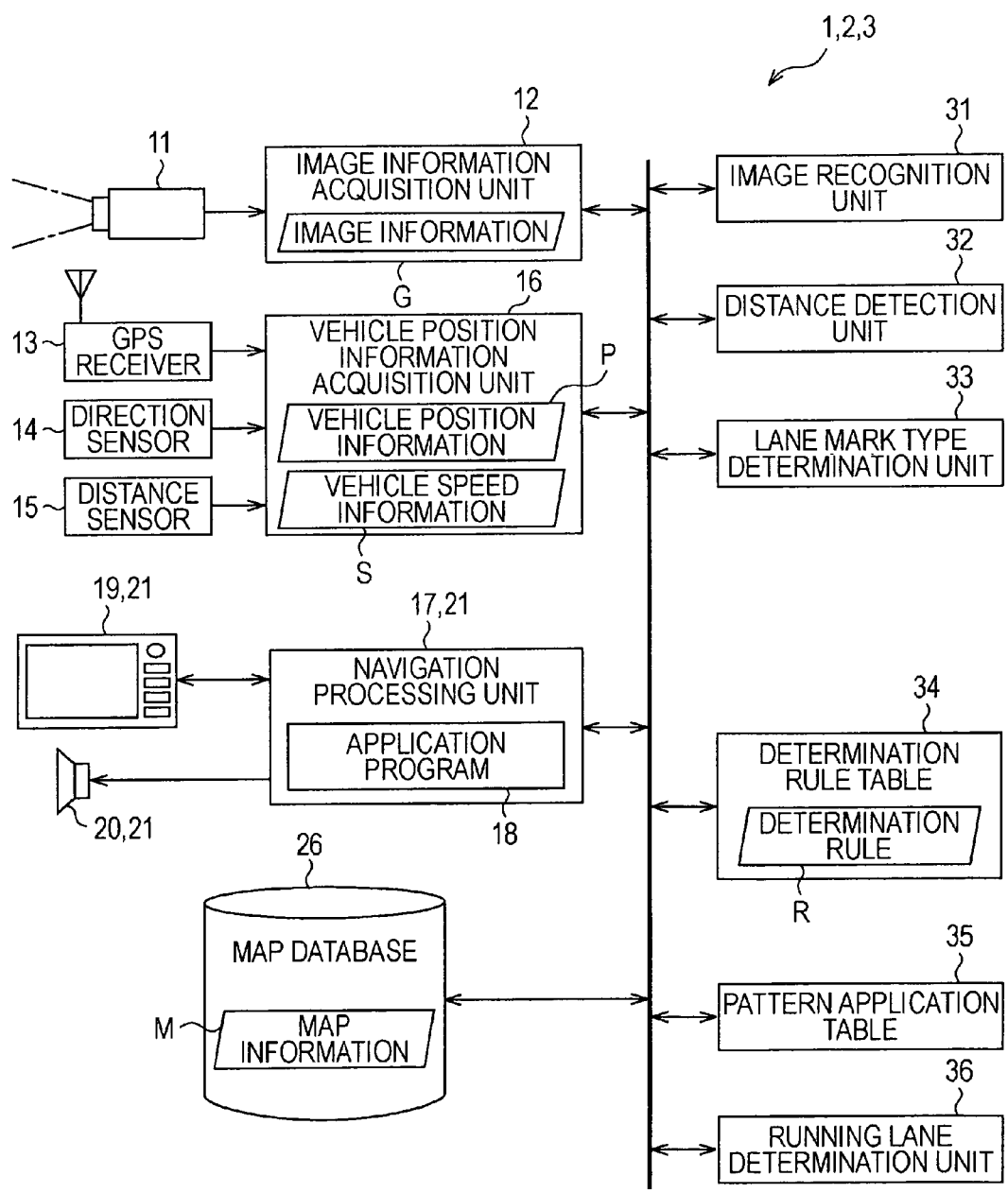
FIG. 1 is a block diagram of an exemplary configuration of a navigation apparatus.

FIG. 1 is a block diagram illustrating an exemplary configuration of the navigation apparatus 1. The navigation apparatus 1 is capable of operating as an image recognition apparatus 2 configured to acquire image information G of a plurality of frames of images of a road surface Ro (see FIG. 3) in an area close to the vehicle C, detect leading and trailing ends of a lane mark, detect the distance from one of the leading and trailing ends of the lane mark to the other end, and determine the lane mark type on the basis of the detected distance. The navigation apparatus 1 also has a capability of functioning as a running lane determination apparatus 3 configured to determine a lane in which a vehicle C is running, on the basis of the lane mark type determined by the image recognition apparatus 2. The navigation apparatus 1 also has ordinary navigation functions. That is, the navigation apparatus 1 is capable of acquiring vehicle position information P indicating the current position and the running direction of the vehicle C, acquiring map information M from the map database 26, and providing various services on the basis of the acquired information. The services include displaying the vehicle position on the map, searching for a route from a starting point to a destination, providing guidance associated with the route to the destination, etc.

As shown in FIG. 1, the navigation apparatus 1 includes various functional units such as an image information acquisition unit 12, a vehicle position information acquisition unit 16, a navigation processing unit 17, an image recognition unit 31, a distance detection unit 32, a lane mark type determination unit 33, and a running lane determination unit 36. These functional units are implemented by hardware or software (a program) or by a combination of hardware and software using a controller (central processing unit "CPU") or the like. The CPU may be disposed for each functional unit, or a single CPU may be shared by a plurality of functional units. The functional units described above are adapted to transmit/receive information among them. The map database 26 may be implemented using hardware such as a combination of a storage medium capable of storing information and a drive unit configured to drive the storage medium. More specifically, the map database 26 may be implemented using, for example, a hard disk drive, a DVD drive including a DVD-ROM disk, a CD drive including a CD-ROM disk, or the like. The units of the navigation apparatus 1 according to the present embodiment are described in further detail below.

Map Database

Figure 2:
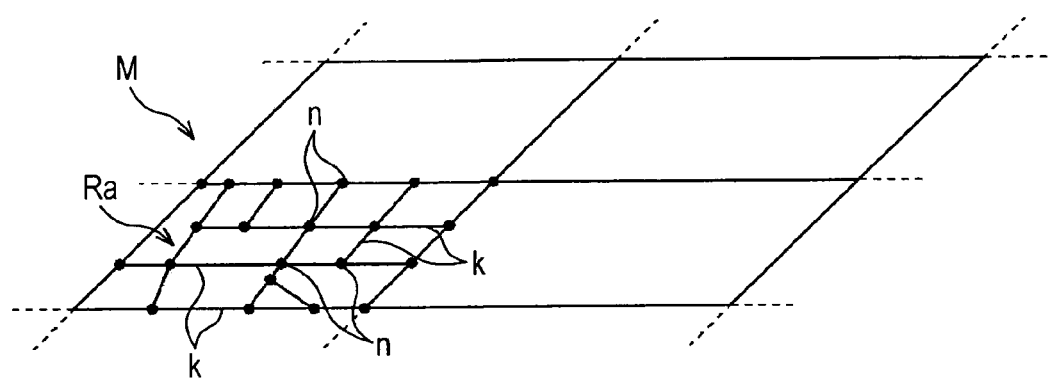
FIG. 2 is a diagram of an example of map information.

The map database 26 functions as a map information storage unit in which map information M including map information associated with a plurality of regions is stored. FIG. 2 is a diagram illustrating an example of the map information M stored in the map database 26. As shown in FIG. 2, the map information M includes road information Ra representing a road network on the basis of a connection relationship among a large number of nodes, n, corresponding to intersections and links k corresponding to roads between adjacent intersections. Each node n has information indicating a location (coordinates) on a map by latitude and longitude. Each two adjacent links k are connected to each other via a node n. Each link k has attribute information indicating a road type, a link length, a road width, and a shape interpolation point by which to represent a link shape. The road type information is information indicating a road type such as an expressway, a national road, a prefectural road, a general road, a narrow street, or a slip road. Note that in FIG. 2, the road information Ra is shown only for one block but the road information Ra of other blocks is not shown.

The road information Ra is used in various processes such as a map matching process, a process of searching for a route from a starting point to a destination, a process of providing guidance to the destination, etc. Although not shown in the figure, the map information M also includes graphics information including various kinds of information used in displaying a map, and intersection information including detailed information associated with intersections, in addition to the road information Ra described above. The graphics information includes background information used to display road shapes, buildings, rivers, etc., and text information used to display city/town names, road names, etc.

Image Information Acquisition Unit

Figure 3:
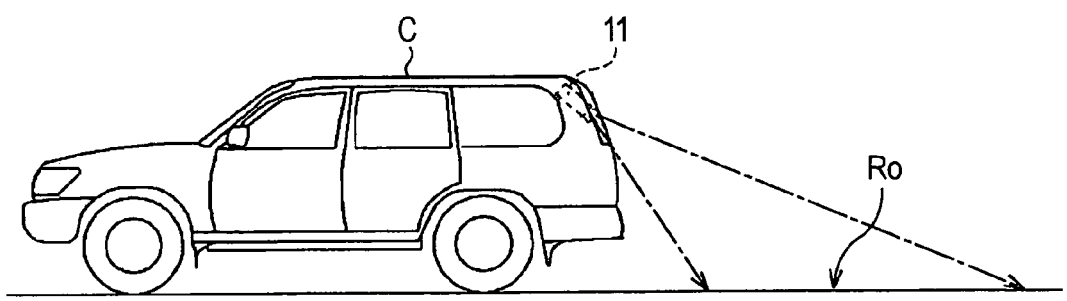
FIG. 3 is a diagram of an example of a manner in which an image sensing apparatus is installed on a vehicle.
Figure 5:
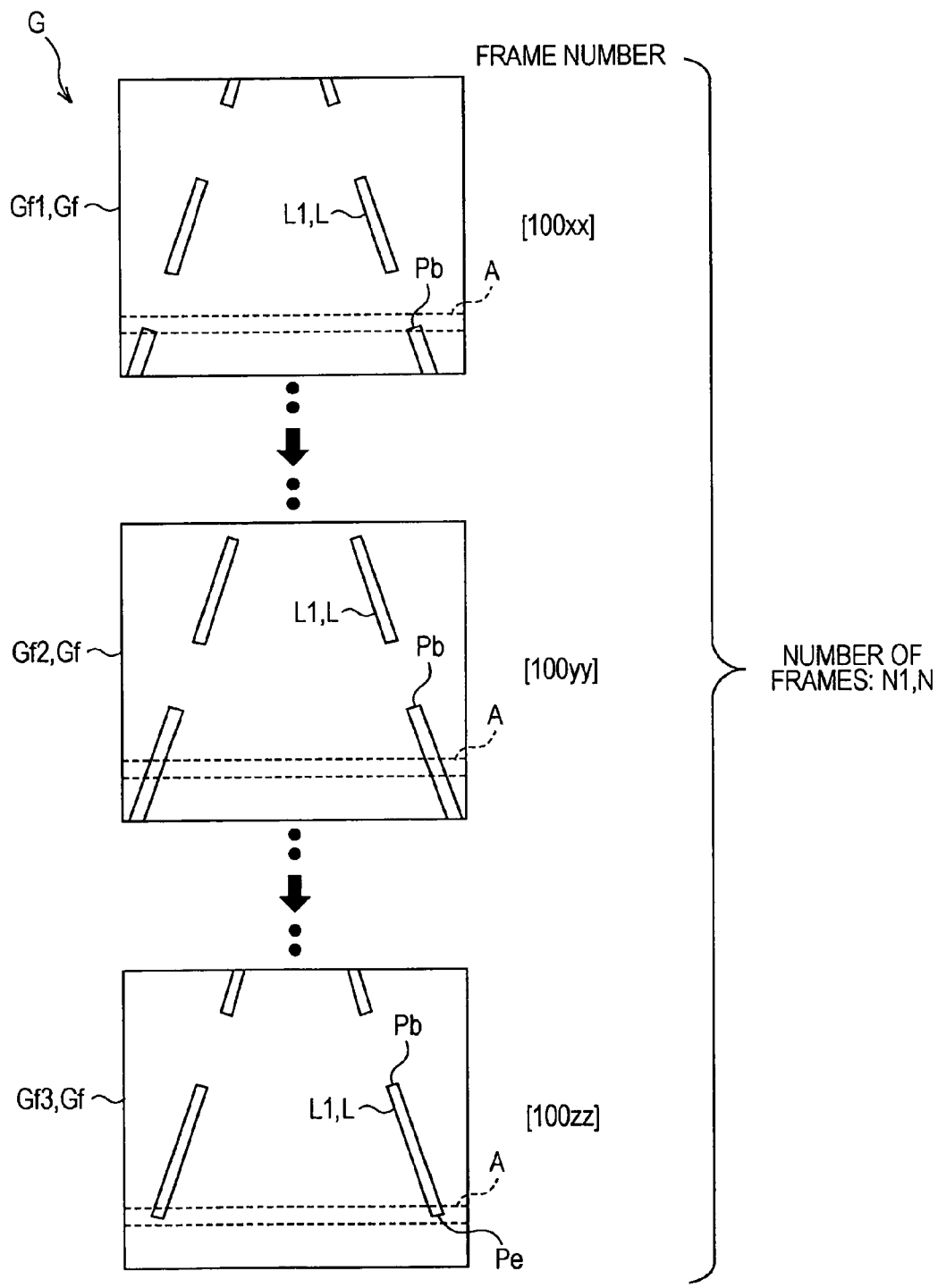
FIG. 5 is a diagram of an example of image information acquired by an image information acquisition unit.
Figure 6:
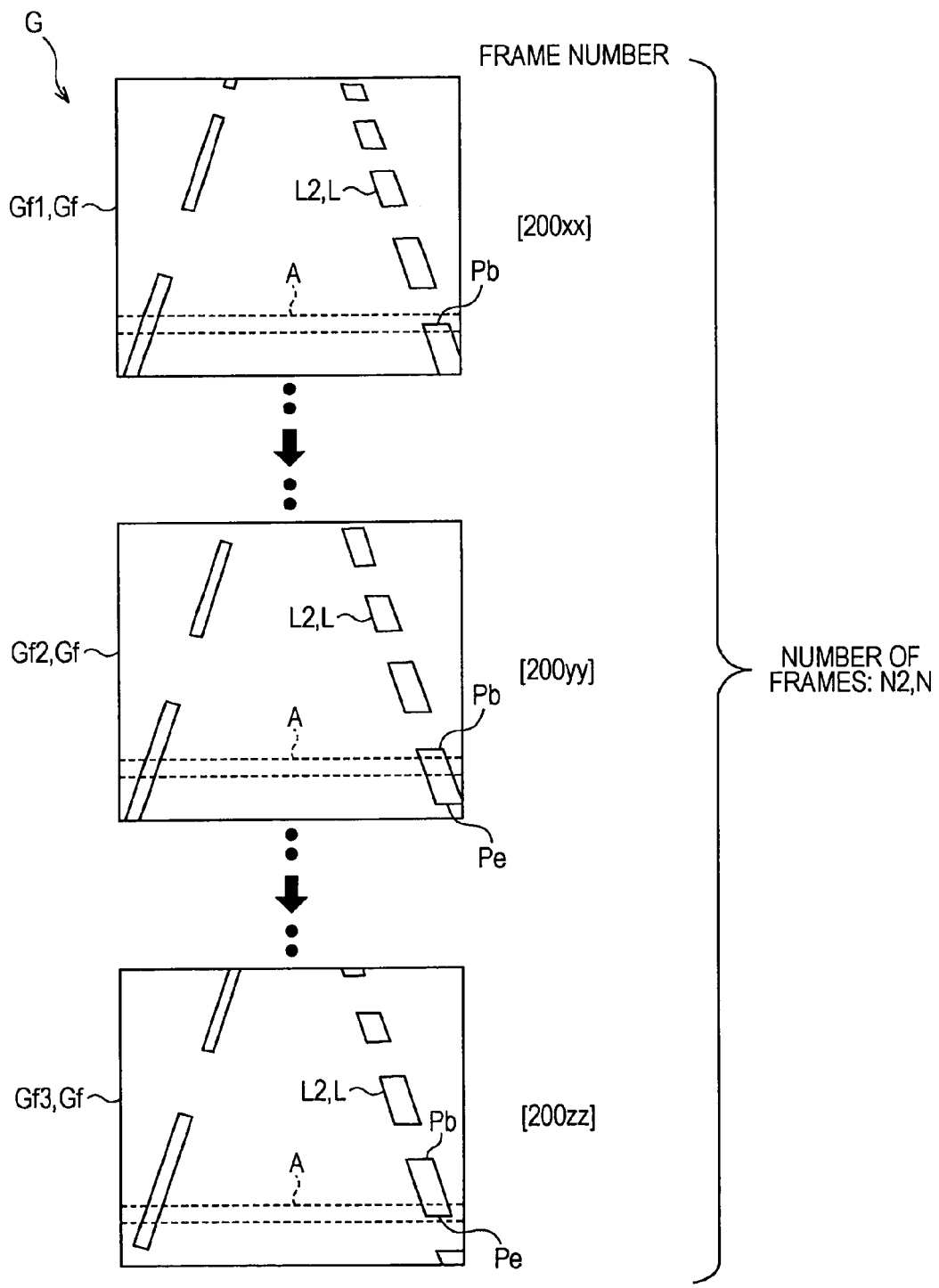
FIG. 6 is a diagram of an example of image information acquired by an image information acquisition unit.
Figure 7:
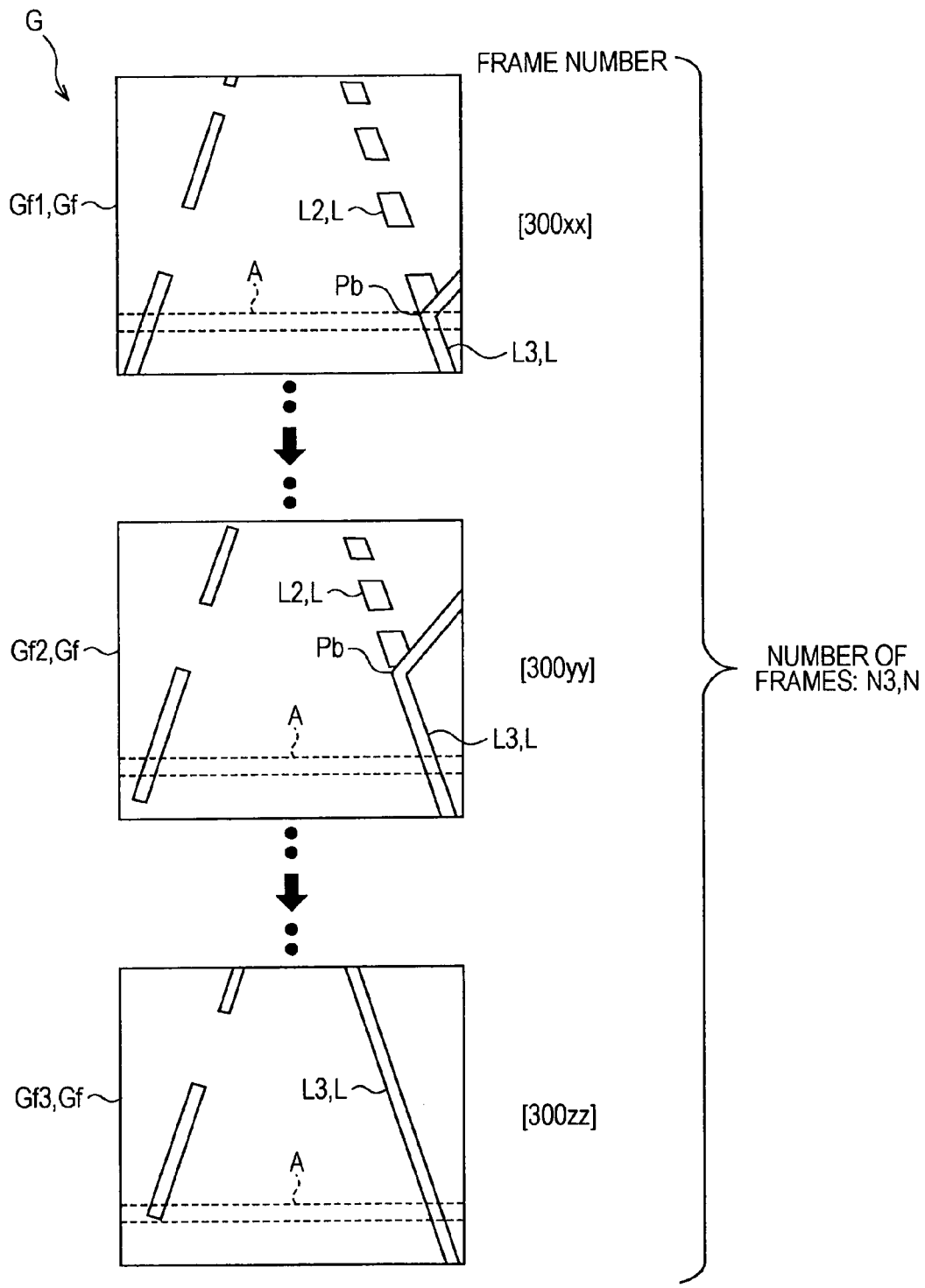
FIG. 7 is a diagram of an example of image information acquired by an image information acquisition unit.

The image information acquisition unit 12 serves to acquire image information G of an image of the surroundings of the vehicle sensed by an image sensing apparatus 11. The image sensing apparatus 11 is an in-vehicle camera having an image sensor, and is installed in the vehicle C so as to face outward such that an image including at least a road surface in the surroundings of the vehicle C is sensed by the in-vehicle camera. As shown in FIG. 3, a rear-view camera is used as the image sensing apparatus 11 and is configured to sense an image of a road surface Ro in an area behind the vehicle C looked down from the vehicle C. The image sensing apparatus 11 senses images at predetermined regular time intervals. The image information acquisition unit 12 acquires, via a frame memory or the like (not shown), image information G of a plurality of frames Gf (FIGS. 5 to 7) of images sensed at the predetermined regular time intervals by the image sensing apparatus 11. The time intervals at which the frames Gf of the image information G are sensed may be set to, for example, 10 to 50 milliseconds. By way of example, the time intervals at which the frames Gf of the image information G are sensed are set to 33.33 milliseconds such that 30 frames of image information G are sensed every second. FIGS. 5 to 7 illustrate specific examples of a plurality of frames Gf of image information G acquired by the image information acquisition unit 12. In these examples shown in FIGS. 5 to 7, frames Gf are captured in order from top to down in the figures with time, and thus a sequence of frames Gf1, . . . , Gf2, . . . Gf3 is acquired. Note that there is one or more frames between frames Gf1 and Gf2 and between frames Gf2 and Gf3, although such frames are not shown in the figures. To the right of each of the frames Gf1, Gf2, and Gf3 in each figure, shown as a frame number, is identification information for identifying the frame. The image information G acquired by the image information acquisition unit 12 is supplied to the image recognition unit 31 described in detail below.

Vehicle Position Information Acquisition Unit

The vehicle position information acquisition unit 16 serves to acquire vehicle position information P indicating the current position of the vehicle C. The vehicle position information acquisition unit 16 is connected to a GPS receiver 13, a direction sensor 14, and a distance sensor 15. The GPS receiver 13 is a device configured to receive GPS signals from GPS (Global Positioning System) satellites. The GPS signals are generally received once every second and supplied to the vehicle position information acquisition unit 16. The vehicle position information acquisition unit 16 analyzes the GPS signals received by the GPS receiver 13 to acquire the current position (latitude and longitude) of the vehicle C, the running direction, and the running speed. The direction sensor 14 is a sensor adapted to detect the running direction of the vehicle C or a change in the running direction. The direction sensor 14 may be implemented, for example, using a gyroscope sensor, a geomagnetic sensor, an optical rotating sensor or a rotary potentiometer disposed on a rotating part of a steering wheel, an angle sensor disposed on a wheel, etc. The direction sensor 14 outputs information indicating the result of the detection to the vehicle position information acquisition unit 16. The distance sensor 15 is a sensor adapted to detect the vehicle speed v (FIG. 4) of the vehicle C or the travel distance. The distance sensor 15 may be implemented, for example, using a vehicle speed pulse sensor configured to output a pulse signal each time a drive shaft or a wheel of the vehicle or a combination of a yaw/G sensor adapted to detect the acceleration of the vehicle C and a circuit adapted to calculate the integral of the detected acceleration. The distance sensor 15 outputs information indicating the detected vehicle speed v and the travel distance to the vehicle position information acquisition unit 16.

On the basis of the information output from the GPS receiver 13, the direction sensor 14, and the distance sensor 15, the vehicle position information acquisition unit 16 performs a calculation to determine the vehicle position. The calculation may be performed using a known method. The vehicle position information acquisition unit 16 also acquires map information M associated with an area around the vehicle from the map database 26 and performs map matching on the basis of the acquired map information M so that the current position of the vehicle C is on a road displayed on the map information M and the running direction of the vehicle C is in a direction along the road. As described above, the vehicle position information acquisition unit 16 acquires the vehicle position information P, including the information indicating the current position of the vehicle C, expressed in latitude and longitude, and also including information indicating the running direction of the vehicle C. Furthermore, in the present example, the vehicle position information acquisition unit 16 acquires the vehicle speed information S indicating the current vehicle speed v of the vehicle C on the basis of the information output from the distance sensor 15.

Navigation Processing Unit

The navigation processing unit 17 operates according to an application program 18 to provide navigation functions, such as searching for a route from a starting point to a destination, guidance of a route to a destination, searching for a destination, etc. The application program 18 causes the navigation processing unit 17 to execute various navigation functions according to the vehicle position information P, the map information M, and information indicating a lane mark type determined by the lane mark type determination unit 33 as described in detail below. More specifically, for example, the navigation processing unit 17 acquires the map information M of an area around the vehicle C from the map database 26 on the basis of the vehicle position information P, and displays an image of a map on a display screen of a display/input unit 19. Furthermore, the navigation processing unit 17 displays a vehicle position mark on the image of the map to indicate the current position and the running direction of the vehicle C. The navigation processing unit 17 also searches for a route from a specified starting point to a destination on the basis of the map information M stored in the map database 26. Furthermore, according to the route detected in the search from the starting point to the destination, and according to the vehicle position information P, the navigation processing unit 17 provides route guidance to a driver using one or both of the display/input unit 19 and the audio output unit 20. More specifically, for example, the navigation processing unit 17 outputs proper guidance information such as a message suggesting that the running lane or the running direction should be changed, in accordance with the running lane determined by the running lane determination unit 36, as will be described in further detail below.

In addition to the navigation functions described above, the navigation processing unit 17 may display information indicating the location of the recognized lane marks and the types thereof on the display/input unit 19 during a lane keep assist operation performed to keep the running route of the vehicle C in the lane. The display/input unit 19 used herein is an apparatus including a display, such as a liquid crystal display, and an input device, such as a touch panel and/or a set of operation switches implemented in an integrated form. The audio output unit 20 is implemented using a speaker. In the present example, a combination of the navigation processing unit 17, the display/input unit 19, and the audio output unit 20 functions as a guidance information output unit 21 for outputting guidance information.

Lane Marks to be Recognized

Figure 4:
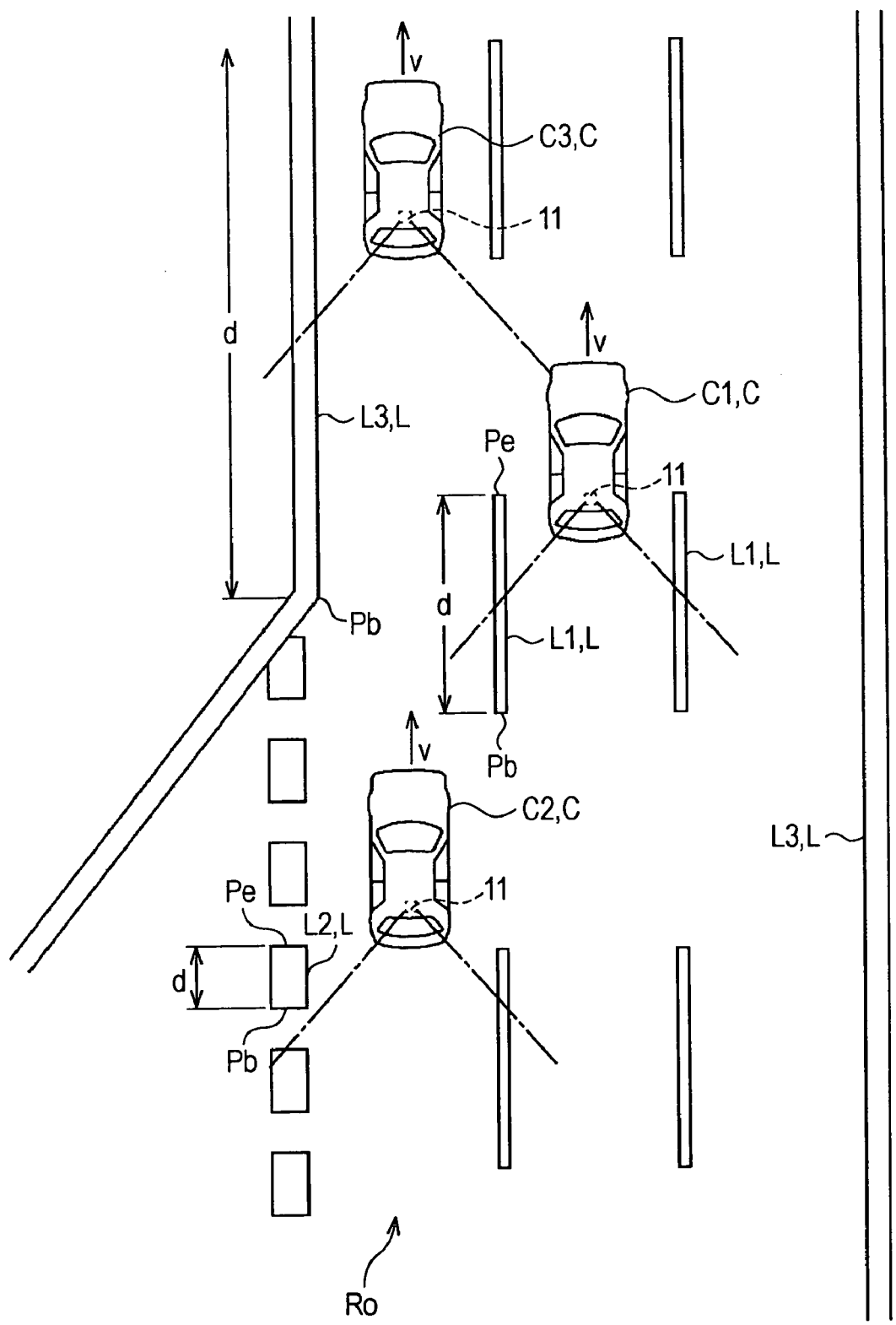
FIG. 4 is a diagram of an example of a road having lane marks to be recognized.

In the present example, as described above, the image recognition apparatus 2 (the navigation apparatus 1) determines the type of a lane mark L included in image information G of a plurality of frames of sensed images of a road surface Ro in an area close to the vehicle C and recognizes the lane mark L. Types of lane marks L subjected to the recognition performed by the image recognition apparatus 2 include white or yellow lines indicating boundaries between adjacent lanes on roads, side ends of outermost lanes of those in which vehicles are allowed to drive, etc. Lane marks actually painted on roads are of various forms, such as solid lines, broken lines whose segments are spaced from each other by particular distances, double solid lines, etc. FIG. 4 is a diagram illustrating an example of a road having lane marks L. In this specific example, FIG. 4 illustrates a part of a junction area of an expressway. In this example, there are three types of lane marks L, i.e., a normal-broken-line lane mark L1, a wide-broken-line lane mark L2, and a solid-line lane mark L3. The normal-broken-line lane mark L1 is a lane mark L in the form of a normal broken line disposed to indicate a boundary between adjacent lanes. The wide-broken-line lane mark L2 is a lane mark L in the form of a broken line disposed to indicate to a boundary between a main expressway road and a road joining it at a junction or a branch point. The wide-broken-line lane mark L2 has segments with a greater length and a shorter space than those of the normal-broken-line lane mark L1. The solid-line lane mark L3 is a lane mark in the form of a solid line disposed at a side end of an outermost lane or a road on which vehicles are allowed to run. The image recognition apparatus 2 according to the present invention may be configured to determine other types of lane mark types in addition to the three types described above. However, in the present example, for simplicity of explanation, it is assumed by way of example that the image recognition apparatus 2 is configured to determine the above-described three types of lane marks. In the following explanation, the term "lane mark" L will be used to generically describe all three types of lane marks.

FIGS. 5 to 7 illustrate examples of image information G acquired by the image information acquisition unit 12. More specifically, FIG. 5 illustrates an example of image information G acquired by a vehicle C1 shown in FIG. 4 in a state in which normal-broken-line lane marks L1 are disposed on both sides of the vehicle C1. In the example shown in FIG. 6, image information G is acquired by a vehicle C2 shown in FIG. 4 in a state in which a wide-broken-line lane mark L2 is disposed to the left (on the right side of the image information G) of the vehicle C2 and a normal-broken-line lane mark L1 is disposed to the right (on the left is of the image information G) of the vehicle C2. In the example shown in FIG. 7, image information G is acquired by a vehicle C3 shown in FIG. 4 in a state in which a solid-line lane mark L3 is disposed to the left (on the right side of the image information G) of the vehicle C3 and a normal-broken-line lane mark L1 is disposed to the right (on the left is of the image information G) of the vehicle C3. As shown in these examples, the image information acquisition unit 12 acquires image information G including a plurality of frames Gf, captured at predetermined regular time intervals, of images of a road surface Ro viewed obliquely downward from the back of the vehicle C. Note that only some frames of the plurality of frames Gf are shown in the figures. The vehicle C acquired by the image information acquisition unit 12 is supplied to the image recognition unit 31 and is subjected to the image recognition process.

Image Recognition Unit

The image recognition unit 31 is configured to perform the image recognition process on the image information G acquired by the image information acquisition unit 12. More specifically, the image recognition process performed by the image recognition unit 31 includes a process of detecting a leading end Pb and a trailing end Pe of a lane mark L in a detection area A (see FIGS. 5 to 7) defined in each frame Gf of the image information G. As shown in FIG. 4, the leading end Pb and the trailing end Pe of the lane mark L are ends in longitudinal direction of a segment of the lane mark L. Note that the leading end Pb is an end farther from the back of the vehicle C while the trailing end Pe is an end closer to the back of the vehicle C. A segment of a lane mark L refers to one of segments of the lane mark L. In the case of the broken-line lane marks L1 and L2, each lane mark includes a plurality of segments spaced from each other by a predetermined distance and extending along a line. In the case of the solid-line lane mark L3, a segment is a continuous long line.

As shown in FIGS. 5 to 7, the detection area A is an area defined in each frame Gf such that the location of the area is fixed for all frames Gf (Gf1 to Gf3) of the image information G. In the present example, the detection area A is defined in each frame Gf such that the detection area A is at the fixed location and has a fixed size regardless of the vehicle speed v of the vehicle C. More specifically, the detection area A is defined at a lower location in each frame Gf such that the detection area A has the same width in the horizontal direction as the width of the frame Gf, and the detection area A has a height in the vertical direction smaller than the height of the frame Gf. The location of the detection area A is preferably set in a lower half of the frame Gf or more preferably in a one-third area at the bottom of the frame Gf. Because the detection area A is defined at the lower location in each frame Gf in the above described manner, only a part of an image included in the detection area A is subjected to the recognition process, and, thus, a high resolution can be achieved in the distance of a leading end Pb and a trailing end Pe of a segment of a lane mark L from the vehicle C.

If the vertical height of the detection area A is set to be too large, a greater processing load is required to perform the image recognition process. Besides, a great error occurs in the distance from the vehicle C to a leading end Pb or a trailing end Pe of a lane mark L due to uncertainty of the position of the leading end Pb or the trailing end Pe in the detection area A. Therefore, it is desirable that the vertical height of the detection area A be set to be as small as possible within a range that allows the detection of a leading end Pb and a trailing end Po of a segment of a lane mark L. Furthermore, preferably, the vertical height of the detection area A is set depending on the number of frames Gf sensed per unit time, the vertical location of the detection area A in the frame Gf, and the assumed maximum velocity of the vehicle C, so that there are no portions of the road surface Ro that are not included between two detection areas A of adjacent frames Gf, even for the highest vehicle speed v (see FIG. 4) of the vehicle C. By setting the vertical height of the detection area A in this manner, it becomes possible to prevent the actual leading end Pb or the trailing end Pe of a lane mark L from being missed in the detection, which can occur if the leading end Pb or the trailing end Pe is not captured in the detection area A.

As described above, the horizontal width of the detection area A is set to be equal to the horizontal width of the frame Gf. This leads to an increase in probability that leading ends Pb and trailing ends Pe of segments of a lane mark L are detected regardless of the location of the vehicle C with respect to a lane of a road, compared with a case in which the horizontal width of the detection area A is set to be part of the horizontal width of the frame Gf. If the detection area A is set in the above-described manner, it is possible to perform the image recognition process to detect two lane marks L when the vehicle C is running between the two lane marks L. However, in the following explanation, for simplicity, it is assumed that in the image recognition process, only one lane mark L located to the left (on the right side of image information G) of the vehicle C is detected. Note that in the image recognition process actually performed by the image recognition unit 31, all lane marks L included in the detection area A, i.e., both lane marks L located on both sides of the vehicle C, are detected.

Thus, the image recognition unit 31 performs the image recognition process to detect the leading end Pb and the trailing end Pe of each segment of a lane mark L from the information of an image in the detection area A defined in each frame Gf of the image information G. More specifically, the image recognition unit 31 performs a binarization process or an edge extraction process on the detection area A of each acquired frame Gf, and extracts contour information of road markings (including lane marks L) in the detection area A. Next, the image recognition unit 31 determines whether the extracted contour information has a feature corresponding to a leading end Pb or a trailing end Pe of a lane mark L. The feature of a leading end Pb or a trailing end Pe of a lane mark L is, for example, an inverted U shape with a width corresponding to the width of the lane mark L. Alternatively, the image recognition unit 31 may use other methods to detect leading ends Pb and trailing ends Pe of lane marks L. For example, a change in luminance in a particular area of an image in the detection area A is detected, and a leading end Pb or a trailing end Pe of a lane mark L may be detected on the basis of the detected change in luminance.

If the contour information extracted from the detection area A has a feature corresponding to a leading end Pb of a lane mark L, the image recognition unit 31 determines that the detection area A includes the leading end Pb of the lane mark L. In this case, the image recognition unit 31 outputs, to the distance detection unit 32, leading end detection information indicating that the leading end Pb of the lane mark L has been detected in the detection area A of the current frame Gf. In addition to the information indicating the detection of the leading end Pb, the leading end detection information also includes identification information identifying the frame Gf in which the leading end Pb of the lane mark L has been detected. In the present example, by way of example, a frame number is used as the identification information. In a case where the contour information extracted from the detection area A has a feature corresponding to a trailing end Pe of a lane mark L, the image recognition unit 31 determines that the detection area A includes the trailing end Pe of the lane mark L. In this case, the image recognition unit 31 outputs, to the distance detection unit 32, trailing end detection information indicating that the trailing end Pe of the lane mark L has been detected in the detection area A of the current frame Gf. In addition to the information indicating the detection of the trailing end Pe, the trailing end detection information also includes identification information identifying the frame Gf in which the trailing end Pe of the lane mark L has been detected. Also in this case, in the present example, the frame number of the frame Gf is used as the identification information. When the vehicle speed v (see FIG. 4) of the vehicle C is high, if the height of the detection area A is not small enough, there is a possibility that the same leading end Pb or trailing end Pe of a lane mark L is detected in the detection area A in a plurality of frames Gf. In this case, the image recognition unit 31 outputs leading end detection information or trailing end detection information only for the first one of the frames Gf in which the leading end Pb or the trailing end Pe is detected.

In the example shown in FIG. 5, when the image recognition process is performed for the lane mark L located to the left (on the right side of image information G) of the vehicle C, the image recognition unit 31 detects the leading end Pb of the lane mark L (more specifically, the normal-broken-line lane mark L1 in this example) in the detection area A in the frame Gf1, while the image recognition unit 31 detects the trailing end Pe of the lane mark L in the detection area A in the frame Gf3. Thus, the image recognition unit 31 outputs leading end detection information including frame number "100xx" of the frame Gf1. Thereafter, the image recognition unit 31 outputs trailing end detection information including a frame number "100zz" of the frame Gf3. On the other hand, in the example shown in FIG. 6, when the image recognition process is performed for the lane mark L located to the left (on the right side of image information G) of the vehicle C, the image recognition unit 31 detects the leading end Pb of the lane mark L (more specifically, the wide-broken-line lane mark L2 in this example) in the detection area A in the frame Gf1, while the image recognition unit 31 detects the trailing end Pe of the lane mark L in the detection area A in the frame Gf3. Thus, the image recognition unit 31 outputs leading end detection information including frame number "200xx" of the frame Gf1. Thereafter, the image recognition unit 31 outputs trailing end detection information including a frame number "200zz" of the frame Gf3. In the case of the example shown in FIG. 7, when the image recognition process is performed for the lane mark L located to the left (on the right side of image information G) of the vehicle C, the image recognition unit 31 detects the leading end Pb of the lane mark L (more specifically, the solid-line lane mark L3 in this example) in the detection area A in the frame Gf1. However, no trailing end Pe is detected in the detection area A in the frame Gf3 and in frames following the frame Gf3. In this case, although the image recognition unit 31 outputs leading end detection information including frame number "300xx" of the frame Gf1, trailing end detection information is not output even after the completion of the image recognition process on the frame Gf3.

Distance Detection Unit

The distance detection unit 32 is configured to detect the distance from one of the leading end Pb and the trailing end Pe of a lane mark L to the other, and output the detected distance as a detected distance d. More specifically, in the present example, the distance detection unit 32 detects the distance d on the basis of the vehicle speed v of the vehicle D and the number of frames N between the frame Gf of the image information G in which the leading end Pb of the lane mark L was detected and the frame Gf of the image information G in which the trailing end Pe of the lane mark L was detected. That is, in the present example, the distance detection unit 32 detects the distance d from the leading end Pb to the trailing end Pe of the lane mark L, i.e., the length of the segment of the lane mark L.

More specifically, on the basis of the vehicle speed v of the vehicle C indicated by the vehicle speed information S, the distance detection unit 32 calculates a travel-per-frame distance U indicating a distance the vehicle C travels per frame of the image information G, and further calculates the product of the travel-per-frame distance U and the number of frames N. The resultant product is employed as the detected distance d. Note that the vehicle speed v of the vehicle C is obtained from the vehicle speed information S acquired by the vehicle position information acquisition unit 16. The travel-per-frame distance U can be obtained by dividing the vehicle speed v of the vehicle C indicated by the vehicle speed information S by the number of frames sensed per unit time by the image sensing apparatus 11, according to Equation (1) shown below.

(Travel-per-frame distance $U$)=(Vehicle speed)/(Number of frames sensed per unit time)  (1)

Thus, for example, when the vehicle speed v of the vehicle C is 54 km/hour and the number of frames is 30 frames/second, the travel-per-frame distance U calculated is 0.5 m.

The number of frames N between the frame Gf in which the leading end Pb of the lane mark L was detected and the frame Gf in which trailing end Pe was detected can be determined from the frame numbers included as identification information of the respective frames Gf in the leading end detection information and the trailing end detection information. For example, in a case where serial numbers are assigned as frame numbers to the respective frames Gf, the number of frames N is obtained by subtracting the frame number described in the leading end detection information from the frame number described in the trailing end detection information. In the example shown in FIG. 5, as described above, the image recognition unit 31 outputs leading end detection information including frame number "100xx" of the frame Gf1, and, thereafter, the image recognition unit 31 outputs trailing end detection information including a frame number "100zz" of the frame Gf3. Therefore, the number of frames N can be obtained by subtracting the frame number "100xx" from the frame number "100zz".

The distance detection unit 32 calculates the distance d by multiplying the travel-per-frame distance U by the number of frames N according to Equation (2) shown below.

(Detected distance $d$)=(Travel-per-frame distance $U$)× (Number of frames $N$)  (2)

Thus, for example, in a case where the travel-per-frame distance U is 0.5 m, and the number of frames N is 16, the detected distance d calculated is 8 m. As can be understand from the above discussion, the detected distance d calculated by the distance detection unit 32 is substantially equal to the distance between the leading end Pb and the trailing end Pe of the lane mark L, as shown in FIG. 4, and, thus, the detected distance d is substantially equal to the length of each segment of the lane mark L. When the lane mark L is a solid-line lane mark L3, the trailing end detection information is not output from the image recognition unit 31 even after the passage of a predetermined number of frames. In this case, the detected distance d may be calculated assuming that the trailing end Pe was detected at the frame the predetermined number of frames after the frame in which the leading end Pb was detected, so that the lane mark type is determined as "solid line" by the lane mark type determination unit 33 in a process performed later. The predetermined number of frames is set to be large enough so that that any solid line is correctly detected as a "solid line". This makes it possible to more quickly determine the lane mark type when image information G including a solid-line lane mark L3 is given.

Determination Rule Table

Figure 8:
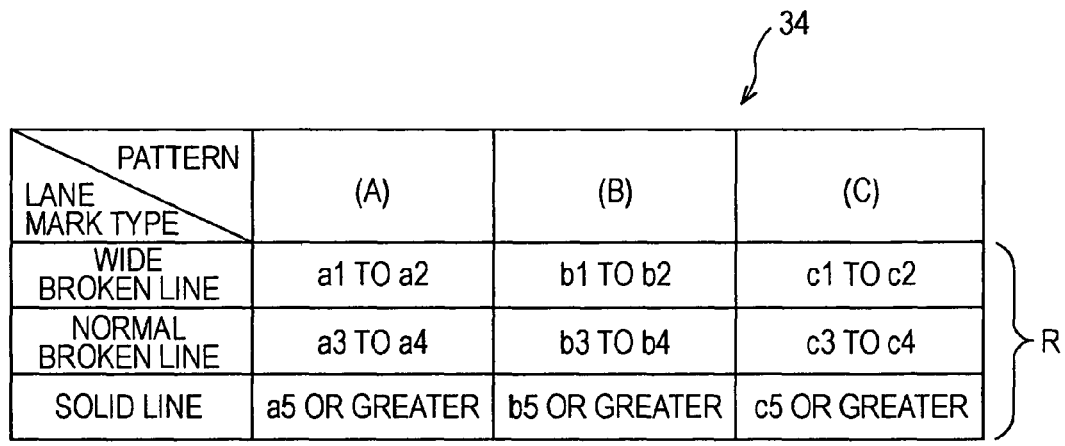
FIG. 8 is a diagram of an example of a determination rule defined in a determination rule table.

In the present embodiment, as will be described in further detail later, the lane mark type determination unit 33 determines the lane mark type in accordance with a predetermined determination rule R. Thus, the determination rule R defined in a determination rule table 34 is first described. The determination rule R defines a range of detected distance d for each of the lane mark types. Hereinafter, the range will be referred to simply as a "distance range". FIG. 8 shows an example of the determination rule table 34 according to the present embodiment. As shown in FIG. 8, as for the broken-line lane mark types (the normal-broken-line lane mark and the wide-broken-line lane mark in the present embodiment), the determination rule R defines upper and lower limits of the distance ranges. On the other hand, for the "solid line" type, such as the solid-line lane mark L3, the determination rule R defines the lower limit of the distance range. Furthermore, the determination rule R also defines the distance range for each of a plurality of broken-line lane mark types that are different in segment length and/or segment space. That is, in the present embodiment, the determination rule R defines the distance range for each of the normal-broken-line lane mark and the wide-broken-line lane mark, which are two types of broken-line lane marks L (L1 and L2). Furthermore, the determination rule R defines a plurality of distance ranges for each of lane mark types. That is, in the present embodiment, a plurality of patterns are defined as distance ranges for each of three lane mark types. More specifically, a pattern (A), a pattern (B), and a pattern (C) are defined for each of the three lane mark types.

The determination rule R defined in the determination rule table 34 is described in further detail below. As shown in FIG. 8, in the determination rule table 34, the distance ranges are defined as the determination rule R for the respective three lane mark types, i.e., the "wide-broken-line lane mark", "normal-broken-line lane mark", and the "solid-line lane mark". More specifically, for example, for the pattern (A), the determination rule R defines the distance range as from "a1 to a2" (the lower limit and the upper) for the "wide-broken-line lane mark", as from "a3 to a4" (the lower limit and the upper limit) for the "normal-broken-line lane mark", and as equal to or greater than "a5" (the lower limit) for the "solid-line lane mark". The distance ranges of the respective lane mark types are referred to by the lane mark type determination unit 33 to determine the lane mark type by determining which range the distance d detected by the distance detection unit 32 falls within. Thus, the distance ranges of the respective lane mark types are defined such that there is no overlap among the lane mark types. More specifically, the upper and lower limits of the respective distance ranges are defined such that $a1<a2<a3<a4<a5$. The distance range of each lane mark type is determined as follows. For example, for the pattern (A), the distance range of each lane mark type is determined depending on the segment lengths of lane marks L of the respective types (L1, L2, and L3) used for a particular road type or used in a particular region to which the pattern (A) is applied, such that the length of the segment of the lane mark of each type falls within the distance range of the lane mark type but the segment length of any other type does not fall in this distance range. The lower limit "a5" of the distance range for the lane mark type "solid-line" is determined such that the lower limit "a5" is sufficiently greater than the segment length of the normal-broken-line lane mark L1 used in the road types or in the regions to which the pattern (A) is applied. In the present embodiment, the lower limit "a5" of the distance range for the lane mark type "solid-line" is used as a solid-line detection threshold value on the basis of which the lane mark type determination unit 33 evaluates the detected distance d of a lane mark of interest to determine whether the type of the lane mark of interest is a "solid line", as will be described in further detail below. The upper and lower limits of the distance ranges are determined in a similar manner also for the pattern (B) and the pattern (C).

The distance range of each lane mark type is defined separately for the patterns (A), (B), and (C) taking into account the fact that the segment length and/or the space between segments of the normal-broken-line lane mark L1 and the wide-broken-line lane mark L2 vary depending on road types and/or regions, so that correct range values can be used depending on the road types and/or the regions. For example, the segment length and the space between segments of the normal-broken-line lane mark L1 are generally greater for expressways than for general roads such as national roads. For the same road type, the segment length and/or the segment space of the normal-broken-line lane mark L1 and/or the wide-broken-line lane mark L2 can vary depending on the regions, such as administrative districts that manage the roads. In the present embodiment, in view of the above, the upper and lower values of the distance ranges are switched to properly adapt to the differences in the segment length and/or the segment space depending on the road types and/or the regions, thereby to increase the accuracy of the determination of the lane mark type, i.e., the upper and lower values of the distance ranges are selected by selecting one of the three patterns (A), (B), and (C) each defining the upper and lower values of the distance ranges of each lane mark type.

More specifically, as for the lane mark type "wide-broken-line", the distance range (the lower and upper limits thereof) is defined as "a1 to a2" for the pattern (A), "b1 to b2" for the pattern (B), and "c1 to c2", for the pattern (C). One of the patterns (A), (B), and (C) each defining the distance range is selected by the lane mark type determination unit 33 (described below) depending on the road type and/or the regions where the vehicle C is currently running, whereby the lane mark type determination unit 33 correctly determines the lane mark type. Therefore, the patterns (A), (B), and (C) of the distance range are not used at the same time, and, thus, there may or may not be an overlap among these patterns. That is, the distance range of each of the patterns (A), (B), and (C) is determined depending on the road type and/or the region to which the pattern is applied, such that the segment length of, for example, the wide-broken-line lane mark L2 falls within the corresponding defined range. The distance range is defined in a similar manner also for the normal-broken-line lane mark L1 and the solid-line lane mark L3. The lower limits "a5", "b5", and "c5" of the distance range for the lane mark type "solid line" are determined such that they are sufficiently greater than the segment length of the normal-broken-line lane mark L1 for the road types and/or the regions to which the patterns (A), (B), and (C) are applied.

Lane Mark Type Determination Unit

The lane mark type determination unit 33 is configured to determine the lane mark type of a lane mark L of interest on the basis of the distance d detected by the distance detection unit 32. More specifically, the lane mark type determination unit 33 determines whether the detected distance d is within the range whose upper and lower limits are defined in the determination rule R. If so, the lane mark type determination unit 33 determines that the lane mark of interest is of the broken line type ("normal broken line" or "wide broken line" in the present embodiment). On the other hand, if the lane mark type determination unit 33 determines that the detected distance d is greater than the solid-line detection threshold value ("a5", "b5", or "c5" in the present embodiment, as shown in FIG. 8), then the lane mark type determination unit 33 determines the lane mark of interest is of the solid line type. Furthermore, on the basis of the detected distance d, the lane mark type determination unit 33 selects one of the plurality of broken line types of lane marks having different segment lengths and/or segment spaces. More specifically, in the present embodiment, the lane mark type determination unit 33 selects one lane mark type depending on the detected distance d from the plurality of broken line types of lane marks (L1 and L2), including the "normal broken line" and "wide broken line". Furthermore, the lane mark type determination unit 33 switches the distance ranges used in the determination of the lane mark type, depending on the road type and/or the region where the vehicle C is currently running. More specifically, in the present example, the lane mark type determination unit 33 determines the lane mark type according to the determination rule R defined in the determination rule table 34.

Figure 9:
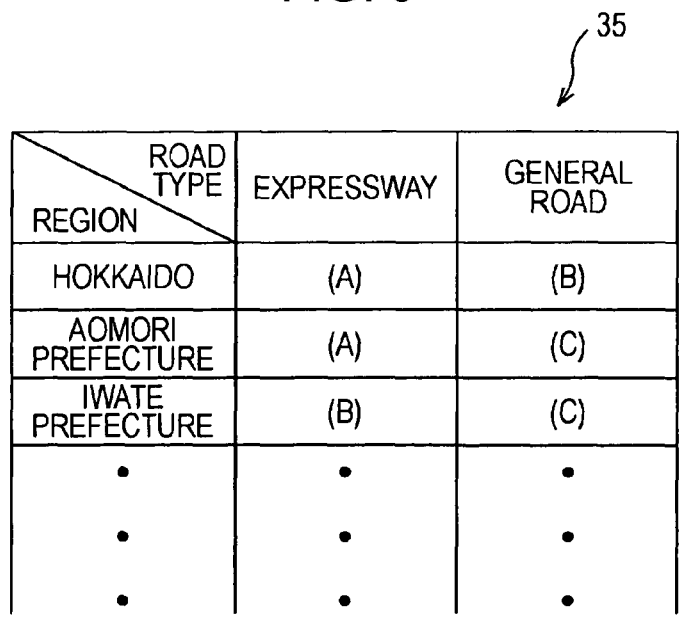
FIG. 9 is a diagram of an example of a pattern application table.

More specifically, the lane mark type determination unit 33 first determines the type of the road on which the vehicle C is currently running and the region in which the road is located, on the basis of the vehicle position information P acquired by the vehicle position information acquisition unit 16 and the map information M stored in the map database 26. The lane mark type determination unit 33 then selects one of the plurality of patterns (patterns (A), (B), and (C) in the present embodiment) according to the pattern application table 35 defining the determination rule R to be applied to the road type and the region where the vehicle C is currently running. The pattern application table 35 is a table defining the determination rule R to be applied depending on a combination of a road type and a region. FIG. 9 shows an example of the pattern application table 35 according to the present embodiment of the invention. As shown in FIG. 9, the pattern application table 35 defines which pattern ((A), (B), and (C)) of the determination rule R should be applied to each combination of a road type and a region, wherein the road types are classified into, for example, "expressway" and "general road", and the regions are classified, for example, by prefectures. Thus, for example, when the lane mark type determination unit 33 determines that the road on which the vehicle C is running is an "expressway" and the region in which the road is located is "Hokkaido," the lane mark type determination unit 33 selects the pattern (A) of the determination rule R. That is, the lane mark type determination unit 33 switches the set of the distance ranges used in the determination of the lane mark type, depending on the type of the road on which the vehicle C is running and/or the region where the road is located.

Thereafter, according to the pattern selected from the patterns (A), (B), and (C) of the determination rule R, the lane mark type determination unit 33 determines the lane mark type by determining in which distance range defined by the determination rule R the distance d detected by the distance detection unit 32 falls. More specifically, if it is determined that the distance d detected by the distance detection unit 32 is in particular one of the distance ranges corresponding to the lane mark types defined by the determination rule R, it is determined that the lane mark L of interest is of the lane mark type corresponding to the detected one of the distance ranges. However, in a case where it is determined that the detected distance d does not fall in any of the distance ranges, it is determined that the image detected by the image recognition unit 31 is not of a lane mark L but of other road marking or feature. More specifically, for example, when the pattern (A) of the determination rule R is selected, if the lane mark type determination unit 33 determines that the distance d detected by the distance detection unit 32 is in the range from "a1" to "a2" corresponding to the lane mark type "wide broken line", then the lane mark type determination unit 33 determines that the lane mark type is "wide broken line." In a case where the detected distance d is in the range from "a3" to "a4" corresponding to the lane mark type "normal broken line," it is determined that the lane mark type is "normal broken line." If the detected distance d is in the range greater than "a5" corresponding to the lane mark type "solid line," then it is determined that the lane mark type is "solid line." On the other hand, in a case where the distance d detected by the distance detection unit 32 does not fall in any of the ranges, the lane mark type determination unit 33 determines that the image whose leading end Pb or trailing end Pe was detected by the image recognition unit 31 is not of a lane mark L but of other road marking or feature.

As described above, on the basis of the detection distance d between the leading end Pb and the trailing end Pe detected by the distance detection unit 32 for the lane mark L of interest, the lane mark type determination unit 33 correctly determines the type of the lane mark L whose leading end Pb and trailing end Pe are detected by the image recognition unit 31. The information indicating the lane mark type determined by the lane mark type determination unit 33 is supplied to the running lane determination unit 36 and the navigation processing unit 17 and is used in the determination of the lane in which the vehicle is running or in the supplying of guidance information.

Running Lane Determination Unit

The running lane determination unit 36 is configured to determine the lane in which the vehicle C is currently running (hereinafter, such a lane will be referred to simply as a "running lane"), on the basis of the information indicating the lane mark type determined by the lane mark type determination unit 33. In the explanation given above, for simplicity, it is assumed that the determination of the lane mark type is performed only for a lane mark L located on one side of the vehicle C. However, in practice, the image recognition unit 31 performs the image recognition process on both lane marks L located on both sides of the vehicle C, and the distance detection unit 32 detects the distance d for each of the lane marks L located on both sides of the vehicle C. The lane mark type determination unit 33 determines the lane mark type for each of the lane marks L on both sides of the vehicle C. The running lane determination unit 36 determines the running lane on the basis of the lane mark types determined in the above-described manner for the lane marks L on the respective sides of the vehicle C.

More specifically, the running lane determination unit 36 determines the running lane on the basis of a combination of lane mark types of two lane marks L on respective two sides of the vehicle C determined by the lane mark type determination unit 33. That is, for example, in a case where it has already been determined on the basis of the vehicle position information P and the map information M that a road in which the vehicle C is running has three lanes, if the lane mark type determination unit 33 detects a solid-line lane mark L3 to the left of the vehicle C and a normal-broken-line lane mark L1 to the right of the vehicle C, then, as with the case of the vehicle C3 shown in FIG. 4, it is determined that the vehicle C is running in a leftmost lane of the three lanes. That is, in this case, the running lane determination unit 36 determines that the running lane is the leftmost lane of the three lanes. On the other hand, in a case where the lane mark type determination unit 33 detects a normal-broken-line lane mark L1 on each of both sides of the vehicle C, the running lane determination unit 36 determines that the running lane is a middle lane of the three lanes (as with the vehicle C1 shown in FIG. 4). In a case where the lane mark type determination unit 33 detects a normal-broken-line lane mark L1 on a left side and a solid-line lane mark L3 on a right side, the running lane determination unit 36 determines that the running lane is a rightmost lane of the three lanes. Also in a case where lane mark type determination unit 33 detects a wide-broken-line lane mark L2 on a left side and a normal-broken-line lane mark L1 on a right side, the running lane determination unit 36 determines that the running lane is a leftmost lane of the three lanes (as with the vehicle C2 shown in FIG. 4). Information indicating the running lane determined by the running lane determination unit 36 is supplied to navigation processing unit 17 and is used in supplying of various kinds of guidance information.

Image Recognition Process

An exemplary image recognition processing method will be described with reference to FIG. 10. The exemplary method may be implemented, for example, by one or more components of the above-described navigation apparatus 1. For example, the exemplary method may be implemented by the functional units or by a controller executing a computer-executable program. However, even though the exemplary structure of the above-described system may be referenced in the description, it should be appreciated that the structure is exemplary and the exemplary method need not be limited by any of the above-described exemplary structure.

Figure 10:
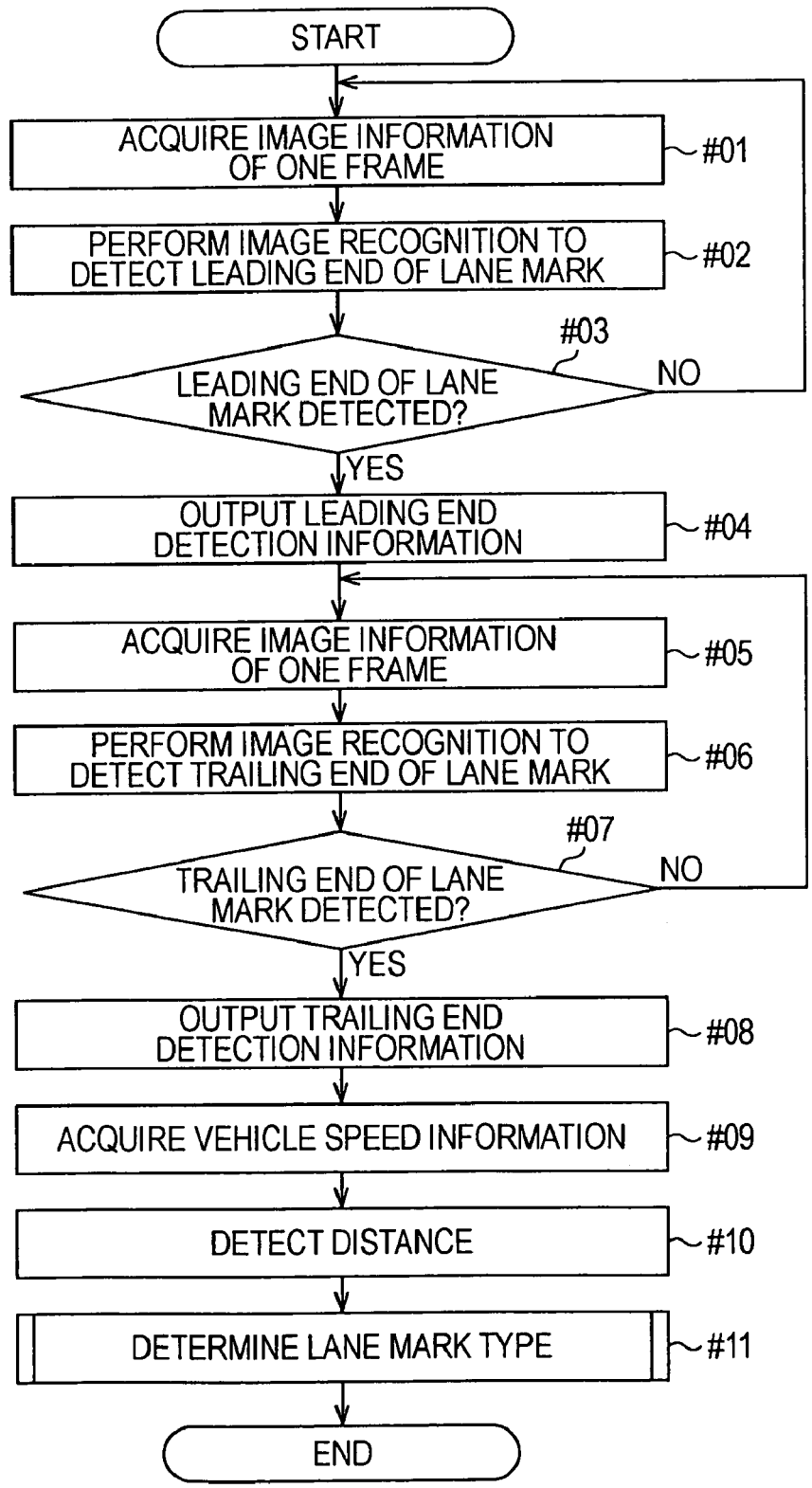
FIGS. 10 and 11 are flow charts illustrating an example of image recognition processes.

As shown in FIG. 10, in the image recognition process of recognizing lane marks, the navigation apparatus 1 first acquires one frame of image information G sensed by the image sensing apparatus 11 via the image information acquisition unit 12 (step #01). As described above, the image information G includes at least an image of a road surface Ro (see FIG. 4) in an area close to the vehicle C. The image recognition unit 31 performs the image recognition process to detect a leading end Pb of a lane mark L included in the detection area A (FIGS. 5 to 7) defined in each frame Gf of image information G (step #02). If no leading end Pb of a lane mark L is detected in the image recognition process in the detection area A in the present frame Gf (that is, if the answer to step #03 is No), the processing flow returns to step #01 to acquire a next frame of image information G and again perform the image recognition process to detect a leading end Pb of a lane mark L (step #02). In a case where a leading end Pb of a lane mark L is detected in the image recognition process in the detection area A in the present frame Gf (that is, if the answer to step #03 is Yes), the image recognition unit 31 outputs leading end detection information to the distance detection unit 32 (step #04).

Subsequently, the image information acquisition unit 12 acquires a next frame of image information G (step #05). The image recognition unit 31 performs the image recognition process to detect a trailing end Pe of the lane mark L included in the detection area A (FIGS. 5 to 7) defined in each frame Gf of image information G (step #06). If no trailing end Pe of the lane mark L is detected in the image recognition process in the detection area A in the present frame Gf (that is, if the answer to step #07 is No), the processing flow returns to step #05 to acquire a next frame of image information G and again performs the image recognition process to detect the trailing end Pe of the lane mark L (step #06). In a case where a trailing end Pe of the lane mark L is detected in the image recognition process in the detection area A in the present frame Gf (that is, if the answer to step #07 is Yes), the image recognition unit 31 outputs trailing end detection information to the distance detection unit 32 (step #08).

Thereafter, the navigation apparatus 1 acquires the vehicle speed information S indicating the current vehicle speed v of the vehicle C via the vehicle position information acquisition unit 16 (step #09). The distance detection unit 32 detects the distance d from the leading end Pb to the trailing end Pe of a segment of the lane mark L (step #10). More specifically, in this step, as described above, the distance detection unit 32 detects the distance d on the basis of the vehicle speed v of the vehicle D and the number of frames N between the frame Gf of the image information G in which the leading end Pb of the lane mark L was detected and the frame Gf of the image information G in which the trailing end Pe of the lane mark L was detected. That is, in the present example, on the basis of the vehicle speed v of the vehicle C indicated by the vehicle speed information S, the distance detection unit 32 calculates a travel-per-frame distance U indicating a distance the vehicle C travels per frame of the image information G, and further calculates the product of the travel-per-frame distance U and the number of frames N. The resultant product is employed as the detected distance d. Thereafter, the lane mark type determination unit 33 performs the lane mark type determination process to determine the lane mark type of the lane mark L on the basis of the distance d detected by the distance detection unit 32. Thus, the image recognition process is completed.

An exemplary lane type determination processing method will be described with reference to FIG. 11. The exemplary method may be implemented, for example, by one or more components of the above-described navigation apparatus 1. For example, the exemplary method may be implemented by the functional units or by a controller executing a computer-executable program. However, even though the exemplary structure of the above-described system may be referenced in the description, it should be appreciated that the structure is exemplary and the exemplary method need not be limited by any of the above-described exemplary structure.

Figure 11:
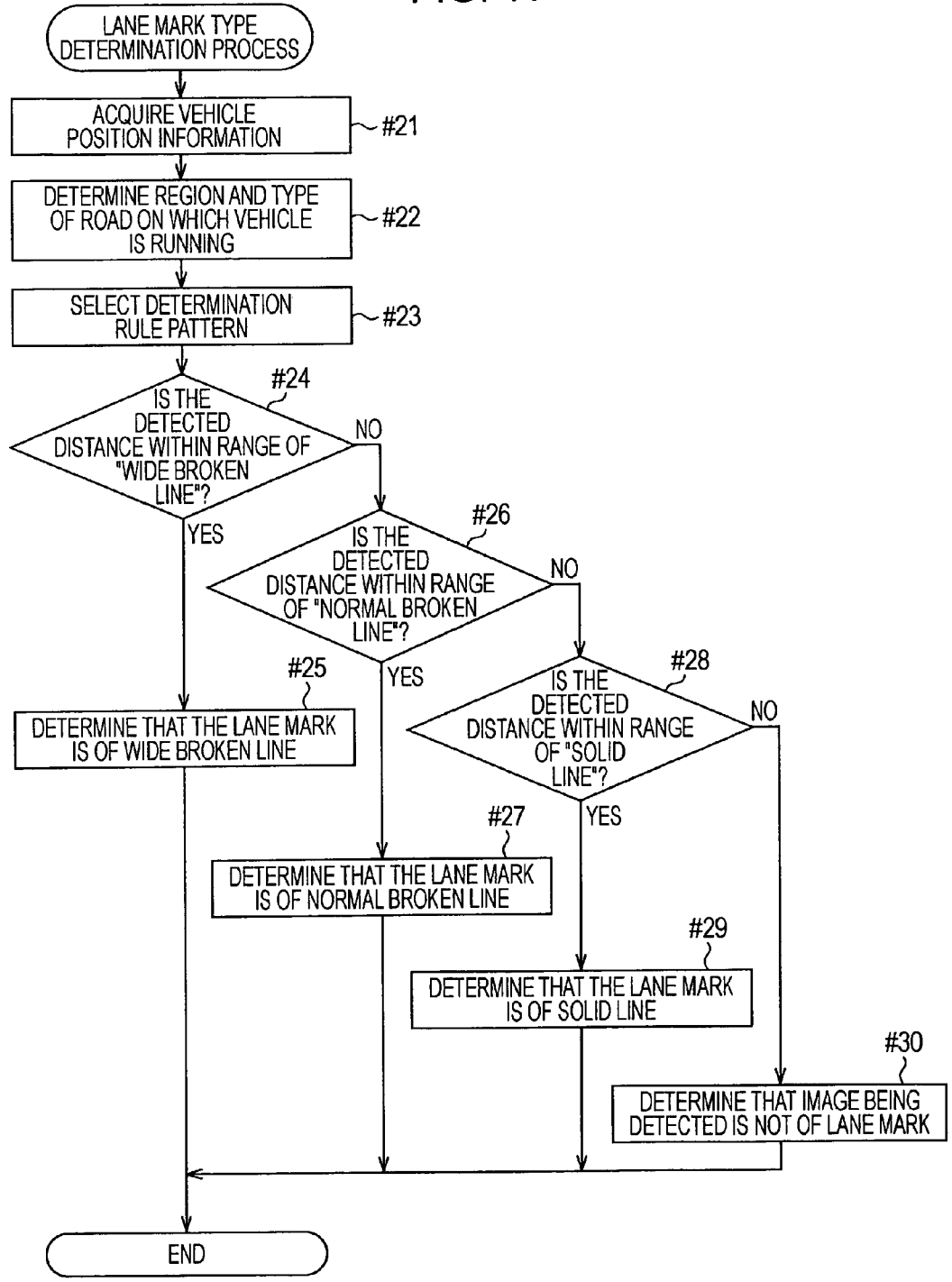

In the lane mark type determination process, as shown in FIG. 11, vehicle position information P is first acquired via the vehicle position information acquisition unit 16 (step #21). Next, on the basis of the vehicle position information P acquired in step #21 and the map information M stored in the map database 26, a determination is made as to a road type of a road on which the vehicle C is running and a region in which the road is located (step #22). Next, according to the road type and the region determined in step #22, a pattern of the determination rule R is selected (step #23). In the present example, the lane mark type determination unit 33 selects a pattern of the determination rule R from the three patterns (A) to (C) according to the pattern application table 35.

Thereafter, a determination is made as to whether the distance d detected in step #10 is within the distance range corresponding to the lane mark type "wide broken line" defined by the determination rule R selected in step #23 (step #24). If the detected distance d is within the distance range corresponding to the lane mark type "wide broken line" defined by the determination rule R (that is, if the answer to step #24 is Yes), the lane mark type determination unit 33 determines that the type of the lane mark L whose leading end Pb and trailing end Pe were detected by the image recognition unit 31 is a "wide broken line" (step #25). If the detected distance d is not within the distance range corresponding to the lane mark type "wide broken line" defined by the determination rule R (that is, if the answer to step #24 is No), a determination is made as to whether the distance d detected in step #10 is within the distance range corresponding to the lane mark type "normal broken line" defined by the determination rule R selected in step #23 (step #26). If the detected distance d is within the distance range corresponding to the lane mark type "normal broken line" defined by the determination rule R (that is, if the answer to step #26 is Yes), the lane mark type determination unit 33 determines that the type of the lane mark L whose leading end Pb and trailing end Pe were detected by the image recognition unit 31 is "normal broken line" (step #27).

If the detected distance d is not within the distance range corresponding to the lane mark type "normal broken line" defined by the determination rule R (that is, if the answer to step #26 is No), a determination is made as to whether the distance d detected in step #10 is within the distance range corresponding to the lane mark type "solid line" defined by the determination rule R selected in step #23 (step #28). If the detected distance d is within the distance range corresponding to the lane mark type "solid line" defined by the determination rule R (that is, if the answer to step #28 is Yes), the lane mark type determination unit 33 determines that the type of the lane mark L whose leading end Pb and trailing end Pe (virtual trailing end Pe) were detected by the image recognition unit 31 is a "solid line" (step #29). If the detected distance d is not within the distance range corresponding to the lane mark type "solid line" defined by the determination rule R (that is, if the answer to step #28 is No), the lane mark type determination unit 33 determines that the image whose leading end Pb and trailing end Pe were detected by the image recognition unit 31 is not of a lane mark L but of another road marking or feature (step #30). Thus, the lane mark type determination process is completed.

Next, an image recognition apparatus 2 according to a another example of the present invention is described below. In the previous example described above, the distance detection unit 32 detects the distance d from a leading end Pb to a trailing end Pe of a lane mark L, i.e., the length of a segment of the lane mark L. In contrast, in the present example, the distance detection unit 32 detects the distance d from a trailing end Pe to a leading end Pb of a lane mark L, i.e., the length of a space between two adjacent segments of the lane mark L. To adapt to the difference in operation of the distance detection unit 32, the determination rule R defined in the determination rule table 34 and the configuration lane mark type determination unit 33 are different from those according to the previous example described above. That is, in the present example, the image recognition apparatus 2 is configured to detect the distance d of a space between adjacent segments of a lane mark L and determine the lane mark type on the basis of the detected distance d. Thus, the image recognition apparatus 2 according to the present embodiment is advantageous in particular when it is used to detect a lane mark type of a broken-line lane mark L whose space varies depending on the lane mark type. In the following explanation, it is assumed by way of example that the recognition is performed for two types of broken-line lane marks L, i.e., the normal-broken-line lane mark L1 and the wide-broken-line lane mark L2, as with the previous example described above. However, for the present example, the image recognition apparatus 2 is similar to that according to the previous example, and the image recognition apparatus 2 is disposed in the navigation apparatus 1. In the following description of the image recognition apparatus 2 according to the present example, the explanation will be focused on the difference from the previous example.

In the present example, as described above, the distance detection unit 32 detects the distance from a trailing end Pe to a leading end Pb of a lane mark L. More specifically, the distance detection unit 32 detects the distance d on the basis of the vehicle speed v of the vehicle D and the number of frames N between the frame Gf of the image information G in which the trailing end Pe of the lane mark L is detected and the frame Gf of the image information G in which the leading end Pb of the lane mark L is detected. More specifically, on the basis of the vehicle speed v of the vehicle C indicated by the vehicle speed information S, the distance detection unit 32 calculates a travel-per-frame distance U indicating a distance the vehicle C travels per frame of the image information G, and further calculates the product of the travel-per-frame distance U and the number of frames N. The resultant product is employed as the detected distance d. The calculation of the travel-per-frame distance U and the number of frames N may be performed in a similar manner to the previous example described above. As can be understood from the above discussion, the detected distance d calculated by the distance detection unit 32 is substantially equal to the distance from the trailing end Pe to the leading end Pb of the lane mark L as shown in FIG. 4, and thus the detected distance d is substantially equal to the length of each space between two adjacent segments of the lane mark L.

In order to allow the distance detection unit 32 to detect the distance of the space in the above described manner, the determination rule R described in the determination rule table 34 defines the lower and upper limits of the distance ranges corresponding to the respective lane mark types ("normal broken line" and "wide broken line" in the present embodiment) depending on the segment space of each of the lane mark types. More specifically, the distance range of each lane mark type is determined as follows. For example, for the pattern (A), the distance range of each lane mark type is determined depending on the length of the space between segments of lane marks L of the respective lane mark types, i.e., the normal-broken-line lane mark L1 and the wide-broken-line lane mark L2 used for a particular road type or used in a particular region to which the pattern (A) is applied, such that the length of the segment space of the lane mark of each type falls within the distance range of the lane mark type but the length of the space of any other type does not fall in this distance range. The determination rule R is similar to that according to the first embodiment described above in that a plurality of distance ranges are defined for each lane mark type, and more specifically, a plurality of patterns of (three patterns (A), (B), and (C)) of distance ranges are defined for each of the two lane mark types, i.e., "normal broken line" and "wide broken line".

The lane mark type determination unit 33 determines the type of lane mark L on the basis of the detected distance d indicating the space length detected by the distance detection unit 32 for the lane mark L in accordance with the determination rule R. More specifically, the lane mark type determination unit 33 selects one lane mark type depending on the detected distance d from the plurality of broken line types of lane marks (L1 and L2), including the "normal broken line" and "wide broken line." More specifically, if the lane mark type determination unit 33 determines that the distance d detected by the distance detection unit 32 is in the range corresponding to the lane mark type "wide broken line," then the lane mark type determination unit 33 determines that the lane mark type is "wide broken line." In a case where the detected distance d is in the range corresponding to the lane mark type "normal broken line," it is determined that the lane mark type is "normal broken line." Also in the present example, as in the previous example described above, the lane mark type determination unit 33 switches the distance ranges used in the determination of the lane mark type depending on the road type and/or the region where the vehicle C is currently running.

As described above, on the basis of the detection distance d from the trailing end Pe to the leading end Pb detected by the distance detection unit 32 for the lane mark L of interest, the lane mark type determination unit 33 correctly determines the type of the lane mark L whose leading end Pb and trailing end Pe are detected by the image recognition unit 31. Also in the present example, as in the previous example described above, the information indicating the lane mark type determined by the lane mark type determination unit 33 is supplied to the running lane determination unit 36 and the navigation processing unit 17 and is used in the determination of the lane in which the vehicle is running or in the supplying of guidance information.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, in an another example, the distance detection unit 32 may detect the distance, as a first distance, from a leading end Pb to a trailing end Pe of a lane mark L, i.e., the length of the segment of the lane mark L, and may further detect the distance, as a second distance, from a trailing end Pe to a leading end Pb of the lane mark L, i.e., the length of a space between two adjacent segments of the lane mark L whereby the lane mark type determination unit 33 may determine the lane mark type on the basis of the first and second distances. In this alternative embodiment, the determination rule R defines a distance range in terms of the first detected distance and a distance range in terms of the second detected distance for each lane mark type. The determination of the lane mark type based on the combination of first and second detected distance may be performed for broken-line lane marks L, while the determination of the lane mark type based on only the first detected distance may be performed for solid-line lane marks L.

In various examples described above, the distance from one of the leading end Pb and the trailing end Pe of a lane mark L to the other is detected as the detected distance d only once, and the lane mark type determination unit 33 determines the lane mark type on the basis of the detected distance d. However, in general, for a broken-line lane mark L, leading end Pb and/or trailing ends Pe are detected periodically a plurality of times. Therefore, in another example, preferably, only when leading ends Pb and/or trailing ends Pe of a lane mark L are detected a plurality of times at regular intervals by the image recognition unit 31, the lane mark type determination unit 33 determines that the type of the lane mark is a broken line ("normal broken line" or "wide broken line").

In various examples described above, the height of the detection area A in each frame Gf of image information G is set to a fixed value. However, the present invention is not limited to these examples. That is, for example, the vertical height of the detection area A may be varied depending on the speed of the vehicle C. More specifically, the vertical height of the detection area A may be set to be as small as possible depending on the speed of the vehicle C, within a range that allows any portion of a road surface Ro to be captured between detection areas A of two adjacent frames Gf. This allows a reduction in the processing load required to perform the image recognition process. Furthermore, it is possible to reduce the error in the distance from the vehicle C to a leading end Pb or a trailing end Pe of a lane mark L due to uncertainty of the position of the leading end Pb or the trailing end Pe in the detection area A.

In various examples described above, the horizontal width of the detection area A in each frame Gf of image information G is set to be equal to the horizontal width of the frame Gf. However, the present invention is not limited to these examples. That is, the horizontal width of the detection area A may be set so as to be a part of the horizontal width of the frame Gf. In this case, preferably, the detection area A may be set such that two lane marks L on respective two sides of the vehicle C are detected in the partial area when the vehicle C runs in the middle of a lane. This allows a further reduction in processing load associated with the image recognition process compared with the case where the horizontal width of the detection area A is set to be equal to the horizontal width of the frame Gf.

In various examples described above, the distance detection unit 32 detects the number of frames N between a frame Gf including a leading end Pb detected for a lane mark L and a frame Gf including a subsequent trailing end Pe detected for the same lane mark L on the basis of the frame numbers of the respective frames Gf described in corresponding leading end detection information and trailing end detection information. However, the method of detecting the number of frames N is not limited to that disclosed above in the examples. For example, when a leading end Pb of a lane mark L is detected by the image recognition unit 31, the distance detection unit 32 may start counting the number of frames of image information G acquired by the image information acquisition unit 12, and the distance detection unit 32 may stop the counting of the number frames when a trailing end Pe of the lane mark L is detected by the image recognition unit 31. The count obtained in this way indicates the number of frames N between the frame Gf including the leading end Pb detected for the lane mark L and the frame Gf including the subsequent trailing end Pe detected for the same lane mark L.

In various examples described above, depending on both of a type of a road on which the vehicle is running and a region where the road is located, the lane mark type determination unit 33 changes the detected distance range defined for each lane mark type as the criterion to determine the lane mark type by determining whether the detected distance is within the defined range. However, the present invention is not limited to these examples. For example, the lane mark type determination unit 33 may change the detected distance range defined for each lane mark type as the criterion to determine the lane mark type, depending on one of the type of the road on which the vehicle is running and the region where the road is located. In this case, the pattern application table 35 may define the determination rule R in terms of patterns ((A), (B), and (C)) to be applied to a plurality of respective road types, or the pattern application table 35 may define the determination rule R in terms of patterns ((A), (B), and (C)) to be applied to a plurality of respective regions. Alternatively, the same distance ranges defined in the determination rule R may be used regardless of the road type or the region. In the case where a plurality of patterns are defined by the determination rule R, the number of patterns may be 2 or 4 or greater.

In various examples described above, the image recognition apparatus 2 in the navigation apparatus 1 also functions as the running lane determination apparatus. However, the present invention is not limited to these examples. The present invention may also be applied to various kinds of other apparatuses that use information obtained as a result of the process of acquiring image information including at least an image of a road surface in an area close to a vehicle, and determining the type of a lane mark included in the image information by performing the image recognition process on the acquired image information. More specifically, for example, the image recognition apparatus 2 according to the present invention may be applied to a vehicle drive control apparatus such as a lane keep assist apparatus.

What is claimed is:

1. An image recognition apparatus comprising:
a controller configured to:
acquire image information of a plurality of frames of images sensed at predetermined regular time intervals, each image including at least a road surface of an area close to a vehicle;
detect a leading end and a trailing end of a lane mark included in a detection area defined in each frame of the image information;
detect a detected distance from one of the leading end and the trailing end of the lane mark to the other one as a detected distance on the basis of the speed of the vehicle and the number of frames between a frame in which one of the leading end and the trailing end of the lane mark is detected and a frame in which the other one of the leading end and the trailing end of the lane mark is detected; and
determine a lane mark type of the lane mark on the basis of the detected distance.

2. The image recognition apparatus according to claim 1, wherein the controller detects the detected distance by calculating the distance that the vehicle travels every frame of the image information on the basis of the speed of the vehicle, multiplying the vehicle traveling distance per frame by the number of frames.

3. The image recognition apparatus according to claim 1, wherein the detection area is a partial area of each frame, the partial area being set to include a location that is common for a plurality of frames of image information.

4. The image recognition apparatus according to claim 1, wherein the controller determines the lane mark type as a broken line, if the detected distance is in a range from a predetermined lower limit to a predetermined upper limit.

5. The image recognition apparatus according to claim 4, wherein the controller selects one of a plurality of types of broken-line lane marks that are different in one or both of segment length and segment space.

6. The image recognition apparatus according to claim 4, wherein depending on at least one of a type of a road on which the vehicle is running and a region where the road is located, the controller changes the detected distance range defined for each lane mark type, the range being a criterion used to determine the lane mark type by determining whether the detected distance is within the defined range.

7. The image recognition apparatus according to claim 4, wherein the controller determines the lane mark type as a broken line only when leading ends and/or trailing ends of the lane mark are detected a plurality of times at regular intervals.

8. The image recognition apparatus according to claim 1, wherein the controller determines the lane mark type as a solid line when the detected distance of the lane mark from the leading end thereof is equal to or greater than a predetermined solid-line detection threshold value.

9. The image recognition apparatus according to claim 1, wherein the controller determines the lane mark type according to a determination rule defining the detected distance for each lane mark type.

10. The image recognition apparatus according to claim 9, wherein the determination rule defines an upper limit and a lower limit of the detected distance range for each broken-line lane mark type.

11. The image recognition apparatus according to claim 9, wherein the determination rule defines the detected distance range for each of a plurality of types of broken-line lane marks that are different in one or both of segment length and segment space.

12. The image recognition apparatus according to claim 9, wherein the determination rule defines a plurality of detected distance ranges for each lane mark type.

13. The image recognition apparatus according to claim 9, wherein the determination rule defines a lower limit of the range of the detected distance as measured from a leading end of a lane mark, for a solid-line lane mark type.

14. A navigation apparatus comprising:
an image recognition apparatus according to claim 1;
a map database in which map information is stored; and
a executable program embodied on a computer readable medium operable to use the map information and information associated with lane mark type determined by the image recognition apparatus;
wherein the controller executes the executable program to output guidance information.

15. A running lane determination apparatus comprising:
an image recognition apparatus according to claim 1;
wherein the image recognition apparatus determines a lane in which a vehicle is running, on the basis of information associated with a lane mark type.

16. A non-transitory computer-readable storage medium storing a computer-executable program usable for image recognition, the program comprising:
instructions for acquiring image information of a plurality of frames of images sensed at predetermined regular time intervals, each image including at least a road surface of an area close to a vehicle;
instructions for performing an image recognition process to detect a leading end and a trailing end of a lane mark included in a detection area defined in each frame of the image information;
instructions for detecting the distance from one of the leading end and the trailing end of the lane mark to the other one as a detected distance on the basis of the speed of the vehicle and the number of frames between a frame in which one of the leading end and the trailing end of the lane mark is detected and a frame in which the other one of the leading end and the trailing end of the lane mark is detected; and
instructions for determining a lane mark type of the lane mark on the basis of the detected distance.

* * * * *